Patented Apr. 27, 1954

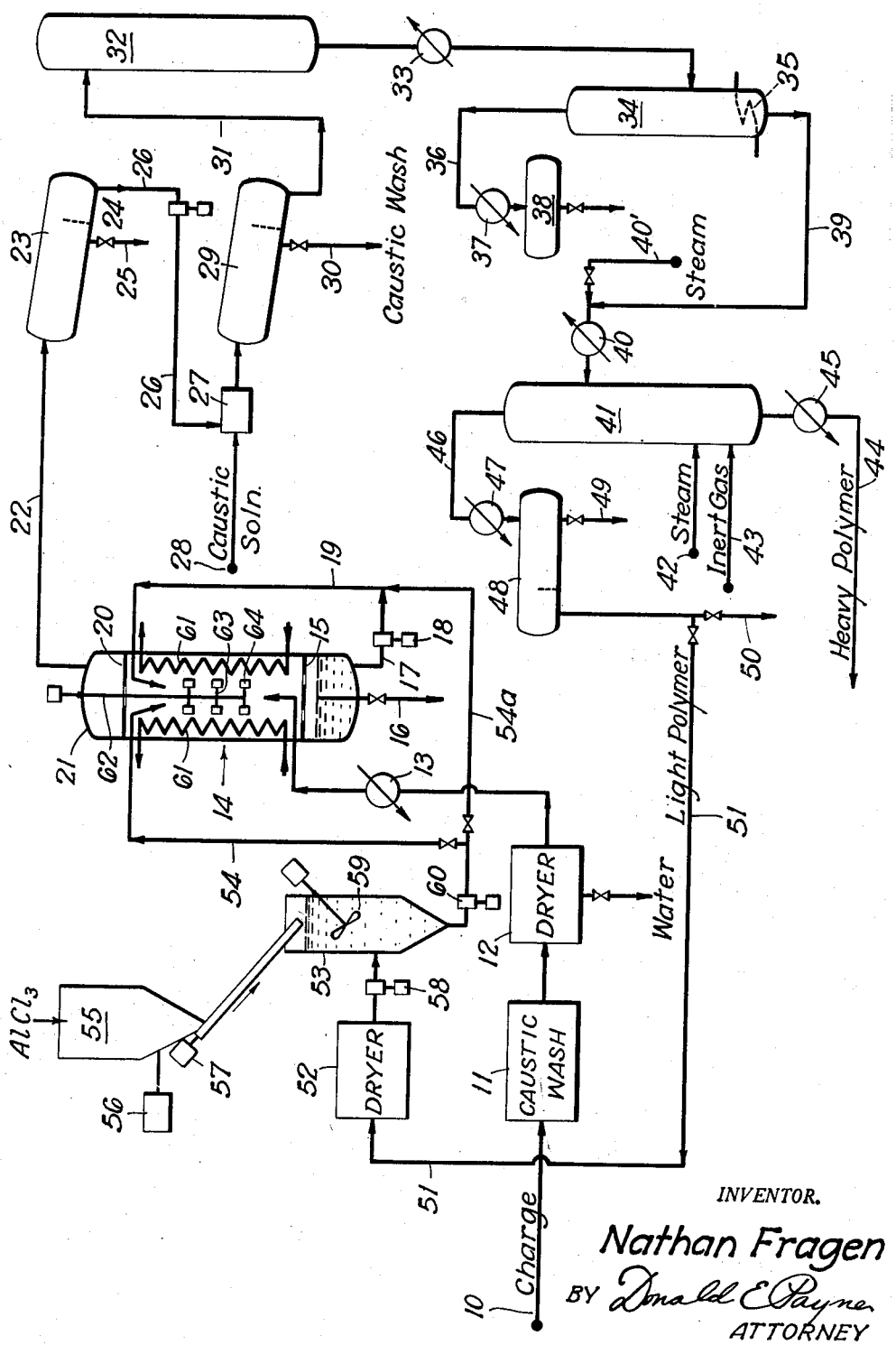

2,677,001

UNITED STATES PATENT OFFICE 2,677,001

ALUMINUM CHLORIDE-HYDROCARBON POLYMERIZATION CATALYST FORTIFICATION

Nathan Fragen, Whiting, Ind., assignor to Standard Oil Company, Chicago, Ill., a corporation of Indiana Application February 27, 1951, Serial No. 212,966

4 Claims. (Cl. 260—683.15)

This invention relates to an improved method and means for polymerizing olefins with an aluminum chloride hydrocarbon complex catalyst and it pertains more particularly to an improved process for obtaining large yields of heavy polymer in the polymerization of mixed butylenes from a butane-butylene refinery stream.

It has long been known that normally gaseous olefins can be converted to viscous liquid polymers by means of solid aluminum chloride as such or by means of liquid aluminum chloride double compounds or complexes. Effective use of an aluminum chloride hydrocarbon complex catalyst has been obtained by passing dispersed liquefied olefins upwardly through a cooled column thereof. An object of this invention is to provide a further improvement in the use of aluminum chloride-hydrocarbon complex in hydrocarbon conversion processes and particularly in processes for polymerizing normally gaseous olefins such as propylene, isobutylenes, normal butenes, and mixtures thereof. A particular object of the invention is to increase the quantity and quality of polymers obtainable in a given polymerization reactor by means of liquid aluminum chloride-hydrocarbon complex catalyst. Other objects will become apparent as the detailed description of the invention proceeds.

Briefly, the invention employs a continuous liquid phase conversion system wherein liquid aluminum chloride-hydrocarbon complex catalyst is dispersed in a continuous liquid hydrocarbon reactant phase, the continuous reactant phase with suspended liquid catalyst is rapidly impelled against cooling surfaces to obtain a high heat transfer coefficient and thus maintain a substantially uniform temperature, the liquid catalyst is continuously separated from the hydrocarbon phase and the bulk of it is recycled and redispersed in the continuous liquid hydrocarbon reactant phase, only a minor amount of the separated complex being withdrawn and the recycled complex being continuously fortified by the addition of a slurry or suspension of aluminum chloride in finely divided form.

As applied to the polymerization of normal and isobutylenes in a petroleum refinery butane-butylene stream, a particular embodiment of the invention contemplates the introduction of said stream into a vertical reactor at a level adjacent but spaced from the bottom thereof, introducing liquid aluminum chloride-hydrocarbon complex catalyst at a level adjacent but spaced from the top of the reactor, stirring the hydrocarbon phase and suspended catalyst in the central portion of the reactor to impel it against peripheral cooling coils or tubes through which a refrigerant is circulated to maintain a temperature in the range of about 0° F. to about 80° F. and preferably about 10° F. to 30° F., maintaining sufficient pressure to insure liquid phase conditions, e. g. about 50–100 p. s. i. g., withdrawing settled complex from a quiescent zone at the bottom of the reactor and effluent product from the top thereof, discarding a minor part of the withdrawn complex and recycling a major part of the withdrawn complex for introduction into the upper part of the reactor at a rate which is greater than the charging stock feed rate, but less than 10 times the charging stock feed rate and which is preferably upwards of 2.5 times, but less than 7.5 times, the rate of charging stock introduction and continuously fortifying recycled catalyst by incorporating therewith (either outside or inside of the reactor) the required amount of powdered aluminum chloride which in this case is usually about .1 to 2.0 pounds per 100 pounds of olefin in the charging stock. The reactor system and its method of operation is described and claimed in copending application Ser. No. 212,890 filed February 27, 1951, and modifications and improvements, particularly with respect to low temperature operations and relating to the nature and amount of the recycled catalyst stream as correlated with the amount of make-up catalyst employed, operating temperature, etc., are described and claimed in copending application Ser. No. 212,917 filed February 27, 1951, the present invention being directed to an improved method and means for supplying the make-up aluminum chloride in systems of this type.

I have discovered that the method of preparing and introducing make-up aluminum chloride is of vital importance to the successful operation of the system. To avoid line plugging and catalyst handling difficulties, I prepare the make-up catalyst as a slurry (rather than as a complex) in light polymer. The make-up aluminum chloride should be in powder form of small particle size. It should be suspended in dry light polymer (in the absence of added HCl) at ordinary temperature and the resulting slurry should be kept in turbulent state to avoid settling out of the powder. The slurry should be made continuously in small amounts and is preferably introduced into the system as make-up catalyst within 2 minutes after its preparation. The use of light polymer as the slurrying agent also facilitates the subsequent flashing and stripping steps in that its recycle (as a make-up catalyst carrying agent) avoids foaming difficulties that might be encountered if the product stream consisted solely of heavy polymer. The term "heavy polymer" as employed herein means polymer having a viscosity greater than 500 seconds (Saybolt Universal) at 210° F., the S. S. U. viscosity of heavy polymer in the particular example hereinafter set forth being about 1000 seconds Saybolt Universal at 210° F. or 100 seconds Furol at 210° F. and being characterized by a flash point of at least 350° F.

The invention will be more clearly understood from the following detailed description of a specific example read in conjunction with the accompanying drawing which forms a part of this specification and which is a schematic flow diagram of my improved process.

While the invention is applicable to liquid phase polymerization of normally gaseous olefins, such as propylene, isobutylene, normal butylenes, and mixtures thereof, it is primarily directed to the polymerization of a butane-butylene mixture associated with butanes in so-called butane-butylene refinery stream. In this example, the charging stock is a petroleum refinery butane-butylene stream containing about 26 weight per cent isobutylene, about 37 weight per cent normal butylenes, and about 36 weight per cent butanes, such stocks usually containing a small amount of propane, propylene, pentanes, and/or pentenes.

About 900 barrels per stream day of the butane-butylene charging stock from source 10 is caustic washed in wash system 11 with about .74 gallon per minute of 10% aqueous NaOH. The wash solution is then dried by passage through calcium chloride driers in drying system 12. The dry charging stock is then cooled to a temperature of about 0° to 30° F. in one or more heat exchangers 13, the charging stock preferably being split at this time and one-third of it charged to each of four continuous reactors so that the charge rate to each reactor will be about 520 gallons per hour.

Each of these reactors 14 is a cylindrical vessel about 12½ feet high and 4½ feet inside diameter. Just above the narrowed bottom portion of the reactor vessel there is a baffle plate 15 provided with spaced openings, e. g. about eight 4 inch holes. The base of the reactor is provided with two outlet conduits. Conduit 16 preferably extends upwardly into a quiescent zone between plate 15 and the bottom of the reactor and it serves to discharge complex from the system. Conduit 17 communicates with the bottom of the reactor and serves as an inlet for pump 18 which recycles liquid catalyst complex through line 19 to a point in the reactor which is adjacent but spaced from the top thereof. In this particular example, catalyst complex is thus recycled at the rate of about 2000 gallons per hour while only about 2 to 20 gallons of complex is discharged through conduit 16.

At the upper part of the reactor, a doughnut baffle 20 is provided with a central opening to facilitate insertion of the stirrer or impeller. The quiescent zone between baffle 20 and the top closure plate 21 provides a settling space for returning any entrained catalyst droplets to the reactor so that substantially catalyst free hydrocarbon product effluent may be withdrawn through product discharge line 22. The product stream thus withdrawn from each reactor is passed through a settling zone 23 provided with vertical baffle 24 for removing any residual entrained catalyst complex, the latter being withdrawn through line 25. The product effluent is then passed by line 26 to mixer 27 wherein it is mixed with about 14 gallons per minute of aqueous caustic solution from source 28. The mixture then passes to caustic settler 29 from which the caustic wash is withdrawn through line 30 and the caustic washed product stream is introduced by line 31 to filter tower 32 which may be a bed of sand, gravel, or preferably limestone (chat) for removing entrained aluminum compounds, particularly gelatinous aluminum hydroxide. The clear product stream then passes through heater 33 and is thence introduced into flash drum 34 which may operate at a pressure of about 100 p. s. i. g. and a top temperature of about 300° F., a bottom temperature of about 320° F. being maintained by heater 35. In the flash tower, unreacted $C_4$ hydrocarbons, chiefly butanes, are taken overhead through line 36, condensed in cooler 37 and collected in receiver 38.

From the base of the flash tower, a mixture of light and heavy polymer passes by line 39 through heater 40 to stripping tower 41. Heater 40 raises the temperature of the polymer mixture to about 525° F. and care should be taken to avoid excessive temperature at this point, a conventional Dowtherm boiler usually being employed to supply heat exchange fluid in heater 40. It is also usually desirable to add 110 pound steam from line 40' in amounts sufficient to facilitate the desired extent of stripping.

The stripper preferably operates at about atmospheric or reduced pressure, the stripping being effected by 110 pound steam introduced by line 42, inert gas preferably being introduced by line 43 at a lower point to insure removal of steam from the heavy polymer stream which is withdrawn at about 475° F. from the base of the stripper through line 44 and cooled in cooler 45. From the three-reactor system, about 300 to 350 gallons per hour of heavy polymer is produced. The light polymer is taken overhead from the stripper by line 46 and passed through cooler 47 to receiver 48. Condensed water is withdrawn through line 49 and the net light polymer production through line 50 (about 110 to 150 gallons per hour for the three-reactor system).

About 140 to 180 gallons per hour of light polymer is recycled by line 51 to serve as a vehicle for introducing make-up aluminum chloride to the system. This recycled light polymer is dried in a calcium chloride drier 52 and then distributed into each of three mixers 53, each of which is connected by line 54 to its respective reactor 14 with an outlet in the reactor at substantially the same level as the outlet of complex recycle line 19. Aluminum chloride powder not larger than 20 mesh and preferably smaller than 40 mesh is discharged from bin 55 (which is preferably vibrated by vibrator 56) in amounts regulated by a screw feeder driven by motor 57 into the open topped mixer 53. Recycled and dried light polymer is introduced into mixer 53 in amounts controlled by pump 58, the mixer preferably being provided with a motor driven stirrer 59. Thus, approximately .1 to 1, in this case about .3, pound of aluminum chloride is dispersed and slurried in each gallon of recycled and dried light polymer and while the slurry remains turbulent, it is forced by pump 60 through line 54 into reactor 14. In this particular example, pump 60 is of the variable speed type which may deliver about .4 to one gallon per minute. Thus, about 40 to 60 gallons per hour of light polymer containing about 10 to 20 pounds per hour of slurried aluminum chloride powder is continuously introduced into each of the three reactors to supply make-up catalyst for fortifying the recycled catalyst complex. This make-up aluminum chloride is thus supplied at a rate of about 0.4 to 0.8 weight per cent based on total charging stock or about 0.6 to 1.2 weight per cent based on total olefins charged. It has been found that smaller amounts of aluminum chloride employed in the manner and under the conditions described in this example produces a somewhat larger proportion of heavy polymer to light polymer, but fails to produce as much total conversion and as much total heavy polymer as I am able to produce in my defined operation. Amounts of aluminum chloride of about 2.0 weight per cent based on total olefins charged is undesirable and wasteful. Thus, the amount of make-up aluminum chloride should be held within the critically defined limits of about 0.6 to 1.2 weight per cent based on total olefins charged in this particular example.

As heretofore stated, aluminum chloride-hydrocarbon complex catalyst is recycled from the base of the reactor to the upper portion thereof through line 19 at a rate of approximately 2000 gallons per hour. For effective catalyst usage and maximum conversion, this catalyst recycle rate should be at least about 500 gallons per hour and it may be as high as 3000 to 4000 gallons per hour, the catalyst in all cases being fortified with the defined amounts of make-up aluminum chloride. The low temperatures are maintained in the reactor by circulating refrigerant through peripheral coils 61 in each reactor and effective heat transfer is attained by impelling the liquid phase hydrocarbon reactant suspended catalyst against these heat exchange surfaces by means of stirrer mechanism, which in this example consists of a motor driven shaft 62 carrying three discs 63 spaced about 2 feet apart on which radial impeller blades 64 are mounted about 45 degrees apart, each impeller blade being about 4 by 5 inches and their tip to tip distance on a diameter being about 20 inches. The impeller shaft is rotated at a rate of about 25 to 250, e. g. about 100 R. P. M. This stirrer mechanism serves the multiple function of obtaining a high heat transfer coefficient and simultaneously assuring intimate dispersion and contact of catalyst in the liquid hydrocarbon reactant phase. The aluminum chloride particles introduced as a slurry through line 54 quickly combine with the dispersed catalyst complex particles and thus fortify the complex in situ. If desired, the make-up catalyst slurry may be introduced by line 54a into complex recycle line 19 instead of being introduced directly into the reactor.

It should be noted that the make-up aluminum chloride slurry is a relatively non-viscous suspension of powdered aluminum chloride and it is prepared at ordinary temperatures in the absence of added HCl so that in the short time of less than 2 minutes before the slurry enters the reactor it does not complex with the light polymer in which it is slurried, but on the contrary combines with the already formed complex to fortify it.

The temperature at which polymerization is effected is very important from the standpoint of total amounts of heavy polymer which are obtainable from a given amount of charging stock. Thus, it has been found that when polymerization is effected at 65° F. with about 0.5 weight per cent make-up aluminum chloride based on total olefins charged, the yield of heavy polymer was only about 13% by volume based on total charging stock. At 45° F. conversion temperature with slightly less than .8 weight per cent make-up aluminum chloride based on total olefins charged, 16 volume per cent of heavy polymer was obtainable based on total charge. At about 25° F. polymerization temperature and employing about .9 weight per cent make-up aluminum chloride, a 20 volume per cent yield of heavy polymer was obtained based on total charge. In all of these three examples, the total product polymer consisted of about 70% heavy polymer and 30% light polymer. It will thus be seen that for maximum polymer production, the conversion temperature should be below about 30° F. and the amount of make-up aluminum chloride should be at least about .5 weight per cent based on total olefins charged. Polymerization temperatures may be even lower than 20° F. and generally speaking, the lower the conversion temperature the higher will be the required amount of make-up aluminum chloride and amount of catalyst complex recycled within the limits hereinabove set forth for attaining maximum conversion and heavy polymer production.

While my invention has thus been described in considerable detail with respect to a specific commercial polymerization operation, it should be understood that the recited example is given by way of illustration and that my invention is not limited thereto. The composition of the butane-butylene stream may be varied throughout a relatively wide range, although it is preferred that the mixed butylenes constitute about 20% to 80% of the total charge and that both isobutylene and normal butylene be present to the extent of at least about 10%. It is important in all cases that the hydrocarbon be in the continuous phase in the stirred portion of the reactor and in some cases it may be advantageous to recycle an aliquot portion of the total hydrocarbon reactor effluent with incoming charging stock. Alternative finishing and fractionation systems may be employed and it is desirable, for example, to introduce ammonia or ammonium hydroxide into the effluent product stream prior to portions of the system wherein corrosion might otherwise be encountered, e. g. prior to mixer 27, prior to heater 33, etc.

The recycle of light polymer as a carrier for make-up aluminum chloride increases the ratio of light polymer to heavy polymer which passes through heater 33 into flash tower 34, into heater 40 and to stripper 41; this serves the useful function of avoiding foaming difficulties which might otherwise be encountered in the flash tower and stripper.

The polymers produced by my invention are of outstanding utility in many industrial fields and they are commercially marketed under the trade name "Indopol."

I claim:

1. The method of adding make-up aluminum chloride to an olefin polymerization system employing aluminum chloride-hydrocarbon complex catalyst and producing heavy polymer having a viscosity greater than 500 seconds Saybolt Universal at 210° F. and light polymer having a viscosity which is not greater than 500 seconds and which is substantially free from unpolymerized hydrocarbons, which method comprises avoiding complex formation of make-up aluminum chloride with slurrying agent in which it is added to the system by drying at least a part of the light polymer, continuously introducing dried light polymer into a mixing zone, separately metering into said mixing zone about .1 to 1 pound of powdered solid aluminum chloride smaller than 20 mesh per gallon of dried light polymer introduced thereto, effecting dispersion of the powdered aluminum chloride in the dry light polymer in the absence of both moisture and HCl and introducing the slurry into the polymerization system as make-up catalyst within about two minutes after its preparation while maintaining the powder suspended in the slurry by pumping it at a rapid rate.

2. In the process of polymerizing normally gaseous olefins containing at least 3 carbon atoms per molecule by introducing charging stock containing such olefins and also containing normally gaseous paraffinic hydrocarbons having at least 3 carbon atoms per molecule in liquid phase at a low level into a conversion zone which directly communicates at its base with a lower settling zone and which communicates at its top with an upper settling zone, introducing aluminum chloride-hydrocarbon complex catalyst and make-up aluminum chloride into said conversion zone at a high level which is below the upper settling zone, at a rate which is in the range of about 1 to 10 times the charging stock feed rate, maintaining the temperature in the conversion zone in the range of about 0 to 80° F. by circulating a refrigerant through peripherally arranged heat exchangers, maintaining a continuous hydrocarbon phase in the conversion zone by withdrawing catalyst complex from the lower settling zone to prevent a complex interface from reaching the level of charging stock inlet, impelling the hydrocarbon phase containing dispersed liquid catalyst complex particles against said peripherally arranged heat exchangers to obtain intimate contact between catalyst and hydrocarbon and simultaneously to keep exchanger surfaces clean and maintain uniform conversion temperature, withdrawing diluted reaction product from the upper settling zone and removing residual catalyst therefrom, recycling a major portion of the catalyst complex removed from the lower settling zone for reintroduction at said high level in the conversion zone, discarding a minor amount of catalyst complex from the system and adding make-up aluminum chloride catalyst to the system to compensate therefor, the improved method of operation which comprises removing normally gaseous hydrocarbons from the polymers produced in the conversion zone, separating the remaining polymers into a heavy polymer stream having a viscosity greater than 500 seconds Saybolt Universal at 210° F. and a light polymer stream of lower viscosity, drying at least a part of the light polymer, continuously introducing dried light polymer into a mixing zone, separately metering into said mixing zone powdered aluminum chloride having a particle size smaller than 20 mesh, dispersing the powdered aluminum chloride in the dry light polymer in the absence of both moisture and HCl to avoid complexing of the aluminum chloride with the light polymer and introducing the resulting slurry to provide said make-up aluminum chloride at said high level in said conversion zone within about two minutes after its preparation in amounts in the range of about 0.1 to 2.0 parts by weight of make-up aluminum chloride per part by weight of olefins charged to the conversion zone.

3. The method of polymerizing isobutylene and normal butenes which comprises introducing a dry liquefied stream consisting essentially of butanes, isobutylene and normal butenes and cooled to a temperature below 30° F. into a conversion zone, separately introducing into said conversion zone a liquid aluminum chloride-hydrocarbon complex catalyst at a rate which is about 1 to 10 times the rate at which the charging stock is introduced thereto, intimately mixing the introduced liquid catalyst with the introduced liquid charging stock in the conversion zone while maintaining the introduced hydrocarbons as a continuous phase and mechanically impelling said hydrocarbons together with suspended catalyst complex against heat exchange surfaces for obtaining high heat transfer coefficient and maintaining the conversion zone at a uniform temperature in the range of about 0 to 80° F., settling catalyst complex from the continuous hydrocarbon phase, recycling most of said settled complex to the reaction zone for resuspension therein, withdrawing diluted product from the reaction zone, removing residual catalyst from said product, then removing from said product unpolymerized hydrocarbons originally introduced with the charging stock, then separating the product into a heavy fraction having a viscosity greater than 500 seconds Saybolt Universal at 210° F. and a light polymer of lower viscosity, drying at least a part of the light polymer, continuously introducing dried light polymer into a mixing zone, separately metering into said mixing zone powdered aluminum chloride smaller than 20 mesh in particle size, dispersing the powdered aluminum chloride in the light polymer in the absence of both moisture and HCl and immediately pumping the slurry at a rapid rate into the conversion zone to supply an amount of make-up aluminum chloride therein in the range of 0.1 to 2.0 weight percent based on total olefins charged to the conversion zone.

4. The method of claim 3 wherein the amount of make-up aluminum chloride introduced into the conversion zone is in the range of 0.6 to 1.2 weight percent based on olefins charged and wherein the slurry of make-up aluminum chloride in light polymer contains an amount of powdered aluminum chloride in the range of 0.1 to 1 pound of aluminum chloride per gallon of light polymer.

References Cited in the file of this patent

UNITED STATES PATENTS

| Number | Name | Date |
|---|---|---|
| 2,397,945 | Burney et al. | Apr. 9, 1946 |
| 2,456,557 | Dyduszynski | Dec. 14, 1948 |